US007855681B2

(12) United States Patent
Minear et al.

(10) Patent No.: US 7,855,681 B2
(45) Date of Patent: Dec. 21, 2010

(54) SYSTEMS AND METHODS FOR DETERMINING ELEMENT PHASE CENTER LOCATIONS FOR AN ARRAY OF ANTENNA ELEMENTS

(75) Inventors: Kathleen Minear, Palm Bay, FL (US); G. Patrick Martin, Merritt Island, FL (US)

(73) Assignee: Harris Corporation, Melbourne, FL (US)

( * ) Notice: Subject to any disclaimer, the term of this patent is extended or adjusted under 35 U.S.C. 154(b) by 290 days.

(21) Appl. No.: 12/273,981

(22) Filed: Nov. 19, 2008

(65) Prior Publication Data

US 2010/0123624 A1 May 20, 2010

(51) Int. Cl.
*H01Q 3/00* (2006.01)
(52) U.S. Cl. ..................................... 342/368
(58) Field of Classification Search ............... 342/368
See application file for complete search history.

(56) References Cited

U.S. PATENT DOCUMENTS

| 3,697,997 | A | * | 10/1972 | Cooper ........................ 342/413 |
| 3,961,172 | A | * | 6/1976 | Hutcheon .................... 708/813 |
| 4,060,809 | A | * | 11/1977 | Baghdady ................... 342/451 |
| 4,358,822 | A | | 11/1982 | Sanchez |
| 4,862,180 | A | * | 8/1989 | Martin ........................ 342/417 |
| 5,315,308 | A | * | 5/1994 | Nehorai et al. .............. 342/448 |
| 6,075,484 | A | | 6/2000 | Daniel et al. |
| 6,816,822 | B1 | | 11/2004 | Hess et al. |
| 6,826,521 | B1 | | 11/2004 | Hess et al. |
| 6,897,807 | B2 | * | 5/2005 | Kishigami et al. .......... 342/417 |
| 7,705,779 | B2 | * | 4/2010 | Goldberg et al. ............ 342/373 |
| 2002/0126045 | A1 | * | 9/2002 | Kishigami et al. .......... 342/417 |

(Continued)

FOREIGN PATENT DOCUMENTS

EP 0 959 522 A1 11/1999

(Continued)

OTHER PUBLICATIONS

Li, Y., et al., "Adaptive Blind Source Separation and Equalization for Multiple-Input/Multiple-Output Systems" IEEE Transactions on Information Theory, vol. 44, No. 7, Nov. 1998.

(Continued)

*Primary Examiner*—Thomas H Tarcza
*Assistant Examiner*—Frank McGue
(74) *Attorney, Agent, or Firm*—Fox Rothschild, LLP; Robert J. Sacco

(57) ABSTRACT

A method for operating a communications system is provided. The method includes receiving a plurality of signals at a plurality of antenna elements, the plurality of signals arriving at the array of antenna elements at a plurality of angles of arrival (AOAs) with respect to a reference location. The method also includes calculating a plurality of differential distance vectors between the plurality of antenna elements and the reference location, each of the plurality of differential distance vectors associated with one of the plurality of AOAs and at least one of the pluralities of signals. The method further includes obtaining a plurality of actual phase center locations for the plurality of antenna elements based on the plurality of differential distance vectors and the plurality of AOAs and providing a correction to configuration data for the array of antenna elements based at least on the plurality of actual phase center locations.

24 Claims, 8 Drawing Sheets

U.S. PATENT DOCUMENTS

| | | | |
|---|---|---|---|
| 2002/0196186 A1 | 12/2002 | Holt et al. | |
| 2003/0236081 A1* | 12/2003 | Braun | 455/273 |
| 2004/0169602 A1 | 9/2004 | Hamada et al. | |
| 2007/0078530 A1 | 4/2007 | Blevins et al. | |
| 2007/0168057 A1 | 7/2007 | Blevins et al. | |
| 2008/0129613 A1 | 6/2008 | Ermutlu et al. | |
| 2009/0167607 A1* | 7/2009 | Holder | 342/453 |
| 2010/0124895 A1* | 5/2010 | Martin et al. | 455/276.1 |
| 2010/0125347 A1* | 5/2010 | Martin et al. | 700/31 |

FOREIGN PATENT DOCUMENTS

| | | |
|---|---|---|
| EP | 1 271 802 A1 | 1/2003 |
| WO | WO 01/65637 A2 | 9/2001 |
| WO | WO 2007/001252 A1 | 1/2007 |
| WO | WO 2008/074925 A1 | 6/2008 |

OTHER PUBLICATIONS

Qin, S., et al., "A Survey of Industrial Model Predictive Control Technology" Control Engineering Practice, Pergamon Press, Oxford, GB, vol. 11, Jan. 1, 2003, pp. 733-764.

Maneri, E., et al., "LQG Controller Design Using GUI: Application to Antennas and Radio-Telescopes" IS Transactions, Instrument Society of America, Pittsburgh, US, vol. 39, No. 2, Apr. 1, 2000, pp. 243-264.

Gawronski, W., Control and Pointing Challenges of Large Antennas and Telescopes: IEEE Transactions on Control Systems Technology, IEEE Service Center, New York, NY, US, vol. 15, No. 2, Mar. 1, 2007, pp. 276-289.

* cited by examiner

SYSTEMS AND METHODS FOR DETERMINING ELEMENT PHASE CENTER LOCATIONS FOR AN ARRAY OF ANTENNA ELEMENTS

BACKGROUND OF THE INVENTION

1. Statement of the Technical Field

The invention concerns communication systems having an array of antenna elements. More particularly, the invention concerns systems and methods for determining the locations of element phase centers for the antenna elements in the array.

2. Description of the Related Art

Multiple element antenna arrays are widely used in wireless communications systems to enhance the transmission and reception of signals. In particular, the enhanced performance is generally provided by using such antenna arrays in conjunction with beamforming techniques. Conventional beamforming takes advantage of interference between electromagnetic waves generated by each of the different antenna elements in the antenna array to change the overall directionality for the array. For example, during transmission, the phase and relative amplitude of the transmitted signal at each antenna element is adjusted, in order to create a desired pattern of constructive and destructive interference at the wavefront of the transmitted signal. During signal reception, the received signals are processed and the different antenna elements are arranged in such a way that a pre-defined pattern of radiation is preferentially observed by the antenna elements.

In general, such antenna arrays typically include a system controller, a plurality of antenna controllers, and a plurality of antenna elements (e.g., dish antennas). Each of the antenna elements is typically communicatively coupled to the system controller and a respective one of the antenna controllers via cables. During transmission and reception, each antenna element converts electrical signals into electromagnetic waves and vice versa. The system controller, using conventional beamforming techniques, varies the configuration of the various components in the antenna array to provide a particular radiation pattern during transmission or reception. However, as the dimensions of the array, the number of antenna elements, and the precision required in certain beamforming applications increases, properly concerting the actions of the various components becomes increasingly difficult.

SUMMARY OF THE INVENTION

Embodiments of the present invention provide systems and methods for determining relative phase center locations for antenna elements in an array of antenna elements. In a first embodiment of the present invention, a method for operating a communications system includes an antenna array having a plurality of antenna elements is provided. The method includes receiving a plurality of signals at the plurality of antenna elements, the plurality of signals arriving at the array of antenna elements at a plurality of angles of arrival (AOAs) with respect to a reference location, and calculating a plurality of differential distance vectors between the plurality of antenna elements and the reference location, each of the plurality of differential distance vectors associated with one of the plurality of AOAs and at least one of the plurality of signals. The method also includes obtaining a plurality of actual phase center locations for the plurality of antenna elements based on the plurality of differential distance vectors and the plurality of AOAs, and providing a correction to configuration data for the array of antenna elements based at least on the plurality of actual phase center locations.

In a second embodiment of the present invention, a control system for a communications system includes an antenna array having a plurality of antenna elements is provided. The control system includes a storage element for receiving signal data for a plurality of signals received at the plurality of antenna elements at a plurality of angles of arrival (AOAs) with respect to a reference location, and a processing element communicatively coupled to the storage element. In the control system, the processing element is configured for calculating a plurality of differential distance vectors between the plurality of antenna elements and the reference location, each of the plurality of differential distance vectors associated with one of the plurality of AOAs and at least one of the plurality of signals, and obtaining a plurality of actual phase center locations for the plurality of antenna elements based on the plurality of differential distance vectors and the plurality of AOAs. The processing element is also configured for providing a correction to configuration data for the array of antenna elements based at least on the plurality of actual phase center locations.

In a third embodiment of the present invention, a computer readable storage, having stored thereon a computer program for operating a communications system includes an antenna array having a plurality of antenna elements, is provided. The computer program includes a plurality of code sections for performing the steps of: receiving a plurality of signals at the plurality of antenna elements, the plurality of signals arriving at the array of antenna elements at a plurality of angles of arrival (AOAs) with respect to a reference location; calculating a plurality of differential distance vectors between the plurality of antenna elements and the reference location, each of the plurality of differential distance vectors associated with one of the plurality of AOAs and at least one of the plurality of signals; obtaining a plurality of actual phase center locations for the plurality of antenna elements based on the plurality of differential distance vectors and the plurality of AOAs; and providing a correction to configuration data for the array of antenna elements based at least on the plurality of actual phase center locations.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
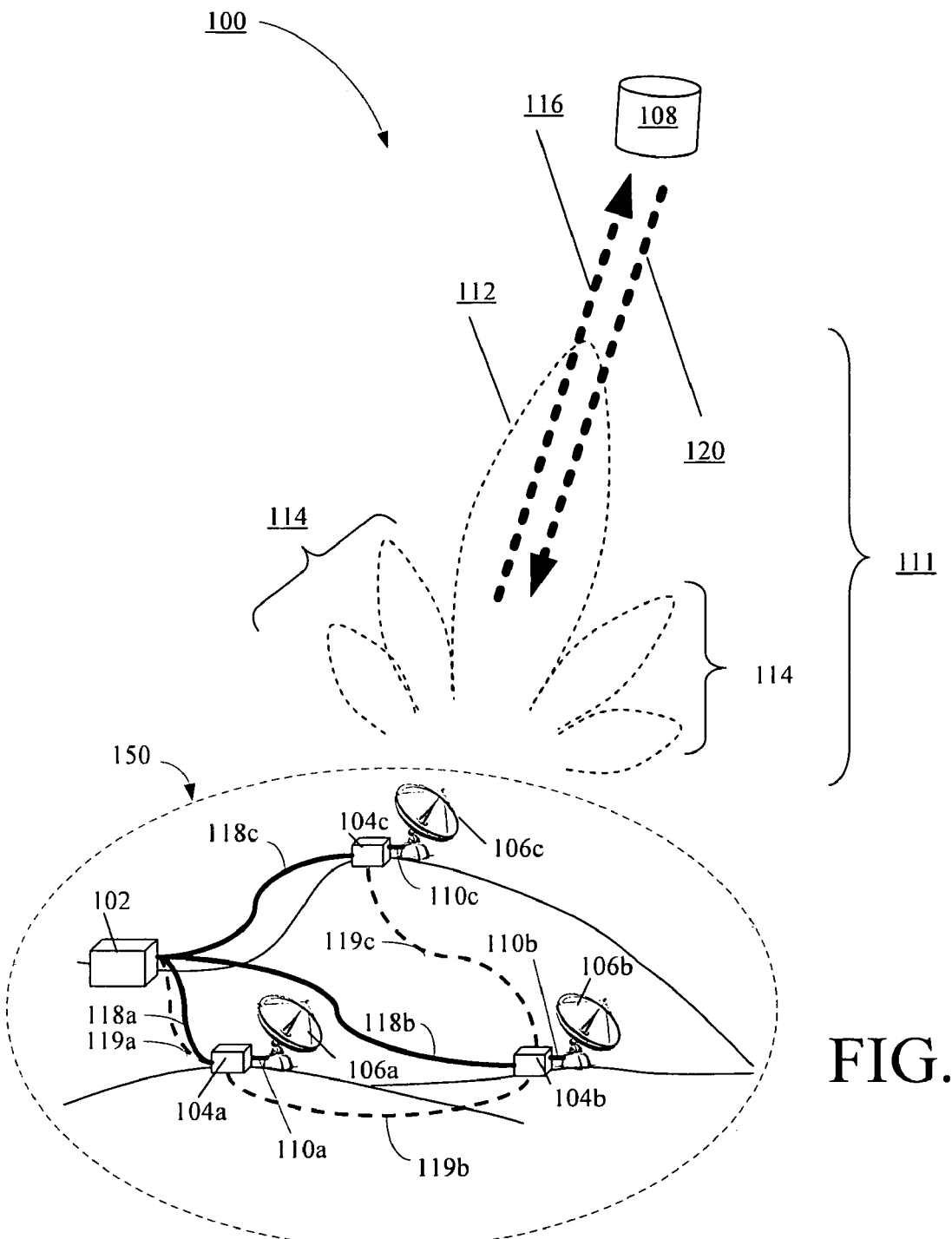
FIG. 1 is a schematic illustration of an exemplary communications system configured according to an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Multi-element antenna arrays are commonly used for providing directional wireless communications by utilizing various beamforming techniques. Typically, the beamforming is performed by using a system model and/or calibration data describing configuration data for the array that is used to determine how to adjust the antenna elements during transmission and reception of signals from one or more sources. However, one of the difficulties with beamforming techniques is that system models and calibration data describing the array are typically limited in accuracy. That is, even though the locations of the elements may be well known, the phase centers of the antenna elements may only be estimated or may vary over time. A "phase center", as used herein with respect to an antenna element, refers to is the point from which the electromagnetic radiation generated by the antenna element spreads spherically outward, with the phase of the signal being equal at any point on the sphere. As a result, if phase center location information is inaccurate, incorrect interference patterns will be generated during beamforming, resulting in reduced signal strength during reception or misalignment during transmission. These difficulties are further exacerbated as the size of the array is increased and the distance to the object of interest is increased. Furthermore, hardware and environmentally induced delays and phasing errors (e.g., due to heating) can further modify the location of the phase center of an antenna element. Therefore increased accuracy of the configuration data for the array is required to provide proper beamforming and more reliable communications.

Multi-element antenna arrays are commonly used for providing directional wireless communications by utilizing various beamforming techniques. That is, the antenna element array is typically configured to receive or transmit in one or more directions via adjustment of antenna element position, antenna element signal amplitude, and/or antenna element signal phase. The resulting interference pattern provides a series of directional beams and nulls which are used to accept and ignore signals, respectively, during transmission or reception tasks. Typically, the beamforming is performed by using a pre-defined system model and/or calibration data that describes the configuration of the antenna array to determine how to adjust the antenna elements to provide enhanced transmission and reception of signals from one or more sources. However, one of the difficulties with beamforming techniques is that such pre-defined system models and calibration data describing the array are typically limited in accuracy.

For example, even high precision measurement techniques for ascertaining the location of the antenna elements are available, as the frequency of operation for the antenna elements increases (e.g., X-band, K-band), a higher degree of precision can be required in order to obtain accurate placement of the antenna elements to allow beamforming using a model. Furthermore, even if accurate placement is possible or the locations of the antenna elements can be initially ascertained via calibration processes, the position of the phase centers of the antenna elements generally can only be estimated or may vary over time. A "phase center", as used herein with respect to an antenna element, refers to a point from which the electromagnetic radiation generated by the antenna element spreads spherically outward, with the phase of the signal being generally equal at any point on the sphere. For example, hardware and environmentally induced delays and phasing errors (e.g., due to heating) can further modify the location of the phase center of an antenna element. As a result of this uncertainty in phase center location, incorrect interference patterns can be generated during beamforming, resulting in reduced signal strength during reception and transmission or even formation of a null in a direction of a signal to be received. These difficulties are further exacerbated as the size of the array is increased and the distance to the object of interest is increased.

To overcome the various limitations of conventional multi-element antenna array communications systems, embodiments of the present invention provide improved systems and methods for obtaining improved phase center location information for the elements in the array based at least on computed differential distance information for the antenna elements with respect to known radiometric sources, a location or direction of the radiometric sources relative to the antenna array, and a reference antenna element in the array. Therefore, in the various embodiments of the present invention, improved phase center location information can be obtained based primarily on reception of signals rather than signal transmission and reception to a reference objects, as in long loop methods, and reduce or eliminate latency and availability issues. Furthermore, the various embodiments of the present invention can obtain the improved phase center locations during other tasks, by measuring known radiometric sources within an existing central beam during a transmission or reception task, reducing or eliminating the need to go off-task.

Although the various embodiments of the present invention will be described with respect to an exemplary embodiment, the present invention is not limited in this regard. The various embodiments of present invention are specifically embodied as a method, a data processing system, and a computer program product. Accordingly, the present invention can take the form as an entirely hardware embodiment, an entirely software embodiment, or any combination thereof.

However, the invention is not limited in this regard and can be implemented in many other forms not described herein.

FIG. 1 shows an exemplary communications system 100 configured according to an embodiment of the present invention. As shown in FIG. 1, the communication system 100 comprises a multi-element antenna system (MEAS) 150 for transmitting signals to and receiving signals from at least one object of interest 108 remotely located from the multi-element antenna system. In FIG. 1, the object of interest 108 is shown as airborne or space borne object, such as an aircraft, spacecraft, a natural or artificial satellite, or a celestial object (e.g., planets, moons, asteroids, comets, etc . . . ). However, the present invention is not limited in this regard and the MEAS 150 can also be used for transmitting and receiving signals from an object of interest 108 that is not airborne or space borne but is still remotely located with respect to the MEAS 150. For example, a ground-based MEAS 150 can be used to provide communications with objects of interest 108 at other ground-based or sea-based locations. The MEAS 150 can generally include an element array control system (ACS) 102 for controlling the operation of multiple antenna elements.

In FIG. 1, the ACS 102 is shown as controlling the operation of antenna elements 106a, 106b, 106c and associated RF equipment 104a, 104b, 104c. The antenna elements 106a, 106b, 106c provide wireless communications. For example, if the MEAS 150 is in a transmit mode, then each antenna element 106a, 106b, 106c converts electrical signals into electromagnetic waves. The radiation pattern 111 resulting from the interference of the electromagnetic waves transmitted by the different antenna elements 106a, 106b, 106c can then be adjusted to provide a central beam 112 in the radiation pattern 111 aimed in a direction 116 of the object of interest 108. The radiation pattern 111 of the antenna elements 106a, 106b, 106c also generates smaller side beams (or side lobes) 114 pointing in other directions with respect the direction of the central beam 112. However, because of the relative difference in magnitude between the side beams 114 and the central beam 112, the radiation pattern preferentially transmits the signal in the direction of the central beam 112. Therefore, by varying the phases and the amplitudes of the signals transmitted by each of antenna elements 106a, 106b, and 106c, the magnitude and direction of the central beam 112 can be adjusted. If the MEAS 150 is in a receive mode, then each of antenna elements 106a, 106b, and 106c captures energy from passing waves propagated over transmission media (e.g., air or space) in the direction 120 and converts the captured energy to electrical signals. In the receive mode, the MEAS 150 can be configured to combined the electrical signals according to the radiation pattern 111 to improve reception from direction 120, as described below.

In FIG. 1, the antenna elements 106a, 106b, and 106c are shown as reflector-type (e.g., dish) antenna elements, which generally allow adjustment of azimuth (i.e., lateral or side-to-side angle) and elevation (angle with respect to a local horizontal reference plane). Therefore, in addition to adjustment of phase and amplitude of the signal transmitted by each of antenna elements 106, the azimuth and elevation of each of antenna elements 106a, 106b, and 106c can also be used to further steer the central beam 112 and to further adjust the radiation pattern 111. However, the present invention is not limited in this regard and antenna elements 106 can comprise either directional or omni-directional antenna elements.

Although three (3) antenna elements 106a, 106b, 106c are shown in FIG. 1, the various embodiments of the present invention are not limited in this regard. Any number of antenna elements can be used without limitation. Furthermore, the spacing between the antenna elements 106a, 106b, and 106c with respect to each other can vary. Accordingly, the antenna elements 106a, 106b, and 106c can be widely or closely spaced to form an MEAS 150 that has a width of up to several kilometers. The antenna elements 106a, 106b, 106c can also be regularly spaced (not shown) with respect to one another to form a two dimensional (2D) grid of antenna elements or arbitrarily spaced (or non-linearly spaced) with respect to one another (as shown in FIG. 1) to form a three dimensional (3D) irregular array of antenna elements. As shown in FIG. 1, an arbitrary spacing for the antenna elements 106a, 106b, 106c can include providing varying elevation as well as varying lateral spacing between the antenna elements 106a, 106b, 106c.

As shown in FIG. 1, each of antenna elements 106a, 106b, 106c is communicatively coupled to a respective RF equipment 104a, 104b, 104c via a respective cable assembly 110a, 110b, 110c (collectively 110). Each of the cable assemblies 110a, 110b, 110c can have the same or different lengths. As used herein, the term "cable assembly" refers to any number of cables provided for interconnecting two different components. In the various embodiments of the present invention, the cables in the cable assembly can be bundled or unbundled.

The RF equipment 104a, 104b, 104c control the antenna elements 106a, 106b, 106c, respectively. For example, the RF equipment 104a, 104b, 104c can include hardware entities for processing transmit signals and receive signals. The RF equipment 104a, 104b, 104c will be described in more detail below in relation to FIGS. 3-4. Additionally, for directional antenna elements, as shown in FIG. 1, the RF equipment 104a, 104b, 104c are configured to provide control signals for control antenna motors (not shown), antenna servo motors (not shown), and antenna rotators (not shown) in antenna elements 106a, 106b, 106c to provide, for example, azimuth and elevation control.

As shown in FIG. 1, each of the RF equipment 104a, 104b, and 104c is communicatively coupled to the ACS 102 via a respective communications links 118a, 118b, 118c. Generally such communications links are provided via a cable assembly; however the present invention is not limited in this regard. In the various embodiments of the present invention, communications links 118 can comprise wire line, or optical, or wireless communications links. The cable assemblies for the communications links 118a, 118b, 118c can have the same or different lengths. Furthermore, although the communications links 118a, 118b, and 118c are shown to be arranged to couple the RF equipment 104 to the ACS 102 in parallel, in other embodiments of the present invention, they can be connected in a series arrangement, such as that shown by communications links 119a, 119b, and 119c.

In operation, the ACS 102 modulates signals to be transmitted by the antenna elements 106a, 106b, 106c. The ACS 102 also demodulates signals received from other antenna systems. The ACS 102 further controls beam steering. The ACS 102 will be described in more detail below in relation to FIGS. 2-5.

Figure 2:
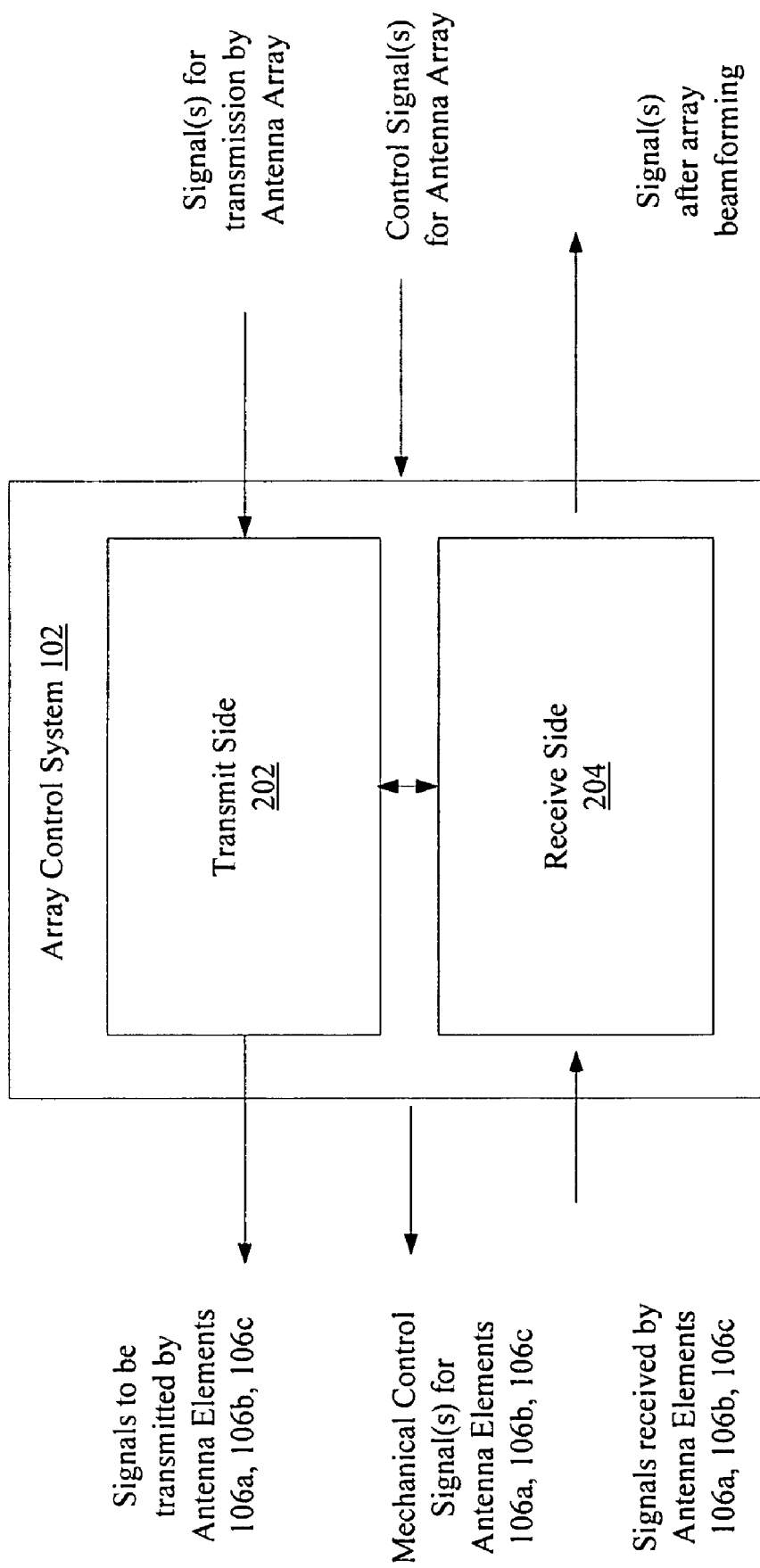
FIG. 2 is a block diagram of the element array control system shown in FIG. 1.

Referring now to FIG. 2, there is provided a more detailed block diagram of the ACS 102 in FIG. 1. As shown in FIG. 2, the ACS 102 includes a transmit side 202 and a receive side 204. Furthermore, the ACS 102 is be configured to manage both transmission and reception operations of the MEAS 150 based on signals for transmission and control signals. In particular, the transmit side 202 can generate signals to be transmitted by the RF equipment 104a, 104b, 104c via antenna elements 106a, 106b, 106c. Additionally or alternatively, the transmit side 202 can receive one or more signals from one or more signal generators (not shown) or receive external control signals. The transmit side 202 is also configured for modulating each of the generated or received signals and communicating the modulated signals to the RF equipment 104a, 104b, 104c for transmission. The transmit side 202 will be described in more detail below in relation to FIG. 3.

The receive side 204 is configured for receiving electrical signals generated by the RF equipment 104a, 104b, 104c based on the energy captured by the antenna elements 106a, 106b, 106c from passing waves. The receive side 204 is also configured for demodulating the electrical signal and communicating the demodulated electrical signal to an output device (not shown). The receive side 204 will be described below in more detail in relation to FIG. 4.

Although the transmit side 202 and the receive side 204 can operate separately or independently, as shown in FIG. 2, in some embodiments of the present invention, operation of the transmit side 302 can be further adjusted based on one or more signals generated in the receive side 204 of the ACS 102.

Figure 3:
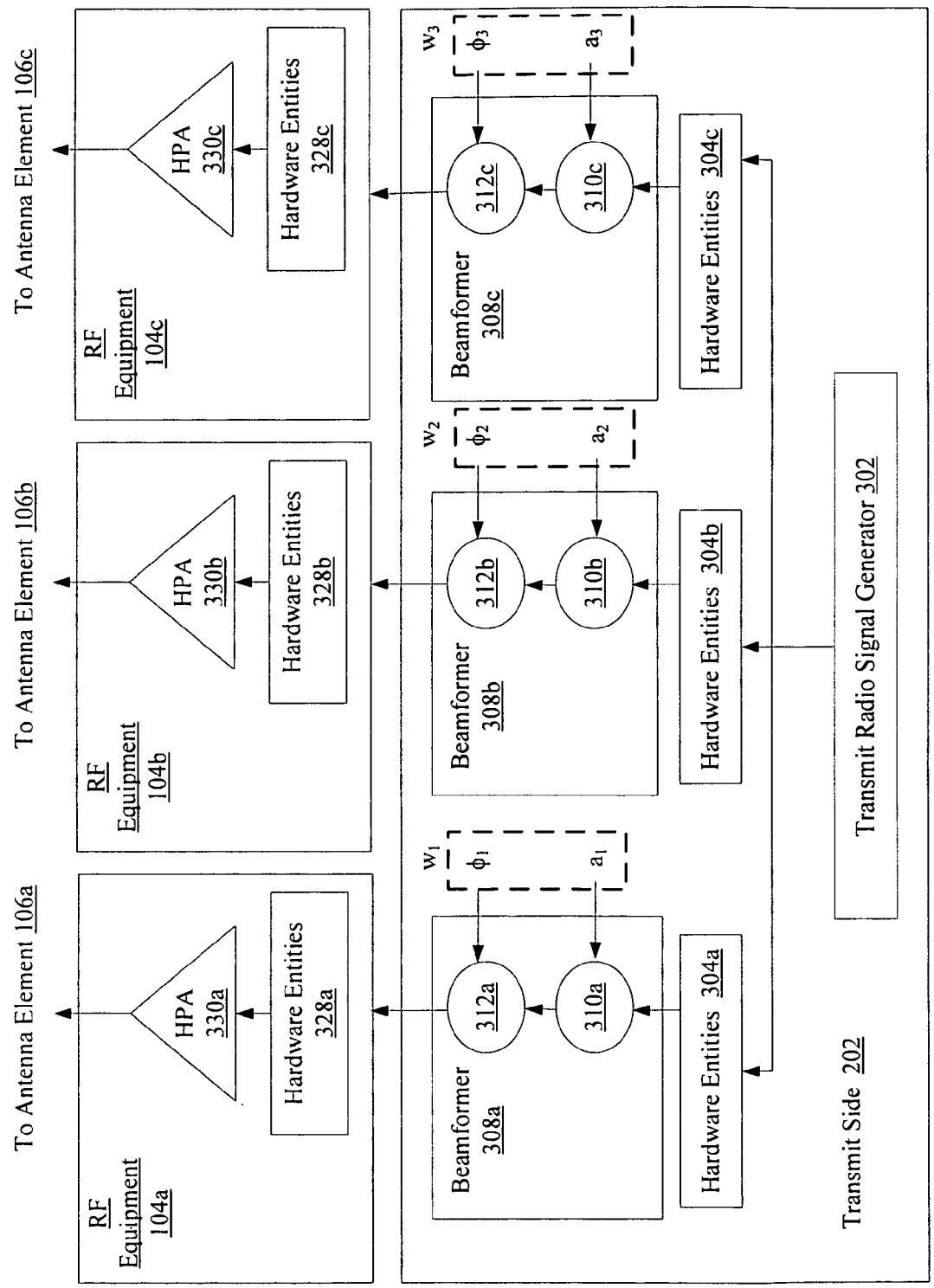
FIG. 3 is a block diagram of the transmit side of the system controller shown in FIG. 2 communicatively coupled to the RF equipment shown in FIG. 1.

Referring now to FIG. 3, there is provided a block diagram of the transmit side 202 of FIG. 2 communicatively coupled to the RF equipment 104a, 104b, 104c of FIG. 1. As shown in FIG. 3, the transmit side 202 is comprised of a Transmit Radio Signal Generator (TRSG) 302, hardware entities 304a, 304b, 304c, and beamformers 308a, 308b, 308c. The TRSG 302 generates signals to be transmitted from the array of antenna elements 106a, 106b, 106c. The TRSG 302 is communicatively coupled to the hardware entities 304a, 304b, 304c. The term "hardware entity", as used herein, refers to signal processing, including but not limited to filters and amplifiers. Each of the hardware entities 304a, 304b, 304c is communicatively coupled to a respective one of the beamformers 308a, 308b, 308c.

Each of the beamformers 308a, 308b, 308c can be utilized to control the phase and/or the amplitude of transmit signals for each antenna element 106a, 106b, 106c. In general, the respective phase shifts ($\phi_1$, $\phi_2$, $\phi_3$) and/or amplitude adjustments ($a_1$, $a_2$, $a_3$) for the antenna elements 106a, 106b, 106c can be used to adjust formation of the central beam 112, the side beams (or side lobes) 114 and nulls in the radiation pattern 111 of the MEAS 150. Nulls correspond to directions in which destructive inference results in a transmit signals strength that is significantly reduced with respect to the directions of the central beam 112 and the side beams 114. The combined amplitude adjustments $a_1$, $a_2$, $a_3$ and phase shift adjustments $\phi_1$, $\phi_2$, $\phi_3$ are referred to herein as a complex weight $w_1$, $w_2$, $w_3$. Each of the beamformers 308a, 308b, 308c combines a respective complex weight $w_1$, $w_2$, $w_3$ with the transmit signals to be provided to a respective RF equipment 104a, 104b, 104c. For example, as shown in FIG. 3, each beamformer 308a, 308b, 308c includes respective amplitude adjusters 310a, 310b, 310c for adjusting an amplitude of the transmit signals from hardware entities 304a, 304b, 304c, respectively, based on an amplitude $a_1$, $a_2$, $a_3$. Each beamformer 308a, 308b, 308c also includes phase adjusters 312a, 312b, 312c for applying adjusting a phase of the transmit signals from hardware entities 304a, 304b, 304c, respectively, based on a respective phase shift $\phi_1$, $\phi_2$, $\phi_3$. The amplitude $a_1$, $a_2$, $a_3$ and phase shift $\phi_1$, $\phi_2$, $\phi_3$ can be generated based on a model or calibration data describing the behavior of the MEAS 151.

Each beamformer 308a, 308b, 308c is communicatively coupled to a respective hardware entity 328a, 328b, 328c of the RF equipment 104a, 104b, 104c to provided the weighted transmit signals. The hardware entities 328a, 328b, 328c are communicatively coupled to a respective high power amplifier (HPA) 330a, 330b, 330c. HPAs are well known to those having ordinary skill in the art, and therefore will not be described herein. However, it should be understood that the HPAs 330a, 330b, 330c communicate signals to the antenna elements 106a, 106b, 106c for transmission therefrom in the direction 116 of an object of interest 108.

Figure 4:
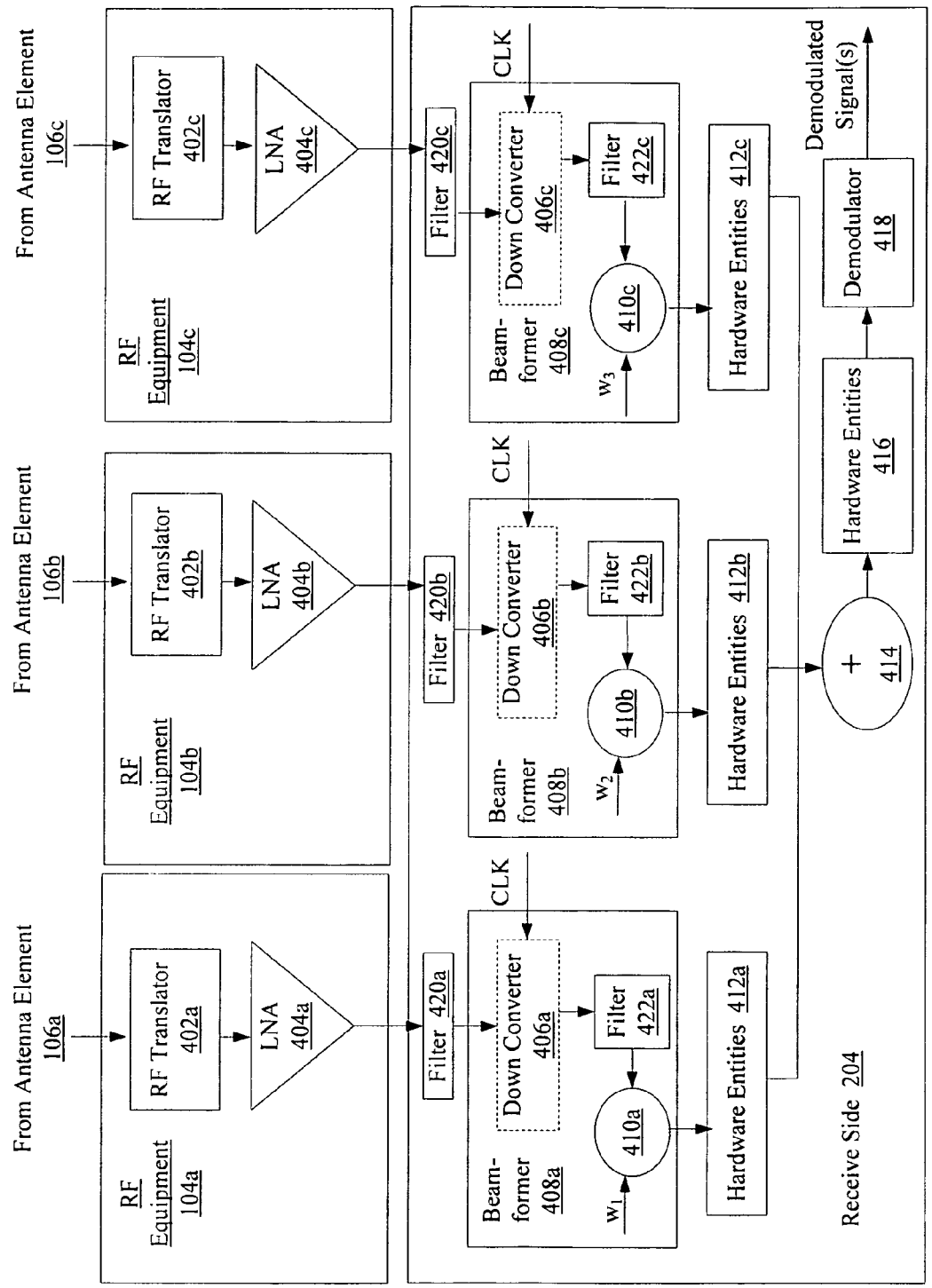
FIG. 4 is a block diagram of the receive side of the system controller shown in FIG. 2 communicatively coupled to the antenna controllers shown in FIG. 1.

Referring now to FIG. 4, there is provided a block diagram of the receive side 204 of FIG. 2 communicatively coupled to the RF equipment 104a, 104b, 104c of FIG. 1. As shown in FIG. 4, each of the RF equipment 104a, 104b, 104c further comprises a Radio Frequency (RF) translator 402a, 402b, 402c and a Low Noise Amplifier (LNA) 404a, 404b, 404c. Each of the RF translators 402a, 402b, 402c performs signal frequency translation of receive signals from a respective antenna element 106a, 106b, 106c in the respective antenna controller 104a, 104b, 104c. The translation function of the RF translators 402a, 402b, 402c generally converts the received signal at a respective antenna element 106a, 106b, 106c from an RF to an intermediate frequency (IF). The LNAs 404a, 404b, 404c generally amplify the IF signals output from the RF translators 402a, 402b, 402c, respectively. Each of the LNAs 404a, 404b, 404c is communicatively coupled to the receive side 204 of the ACS 102.

The receive side 204 further comprises a plurality of filters 420a, 420b, 420c, a plurality of beamformers 408a, 408b, 408c, hardware entities 412a, 412b, 412c, 416, a signal combiner 414, and a demodulator 418. Embodiments of the present invention are not limited in this regard. For example, the receive side 204 can be absent of the filters 420a, 420b, 420c and hardware entities 412a, 412b, 412c, 416.

As shown in FIG. 4, the filters 420a, 420b, 420c are communicatively coupled between the LNAs 404a, 404b, 404c and beamformers 408a, 408b, 408c. Each of the beamformers 408a, 408b, 408c can include a down converter 406a, 406b, 406c, a filter 422a, 422b, 422c, and a combiner 410a, 410b, 410c. Embodiments of the present invention are not limited in this regard. For example, the beamformers 408a, 408b, 408c can be absent of the down converters 406a, 406b, 406c and filters 422a, 422b, 422c.

Each down converter 406a, 406b, 406c can convert a digitized real signal centered at an IF to a basebanded complex signal centered at zero (0) frequency. The down converters 406a, 406b, 406c can share a common clock (not shown), and therefore receive the same clock (CLK) signal. The CLK signal can be generated within the receive side 204, elsewhere in the ACS 102, or external to the ACS 102. The down converters 406a, 406b, 406c can be set to the same center frequency and bandwidth. The down converters 406a, 406b, 406c can also comprise local oscillators that are in-phase with each other. This in-phase feature of the down converters 406a, 406b, 406c ensures that the down converters 406a, 406b, 406c shift the phases of signals by the same amount. After converting the digitized real signals to basebanded complex signals, the down converters 406a, 406b, 406c communicate the basebanded complex signals to the filters 422a, 422b, 422c, respectively. The filters 422a, 422b, 422c filter the basebanded complex signals and forward the same to the combiners 410a, 410b, 410c.

Each of the combiners 410a, 410b, 410c combines a basebanded complex signal with a complex weight $w_1$, $w_2$, $w_3$ for a particular antenna element 106a, 106b, 106c. The complex weights $w_1$, $w_2$, $w_3$ are selected to combine the receive signals according to a particular radiation pattern. That is, complex weights $w_1$, $w_2$, $w_3$ are selected to provide a central beam 112, side beams 114, and nulls, as described above, so as to preferentially receive signals from one or more preferred directions. The combiners 410a, 410b, 410c can include, but are not limited to, complex multipliers. Thereafter, the combiners 410a, 410b, 410c communicate the signals to the hardware entities 412a, 412b, 412c, respectively. The hardware entities 412a, 412b, 412c can further process the signals received from the beamformers 408a, 408b, 408c. The hardware entities 412a, 412b, 412c communicate the processed signals to the signal combiner 414.

At the signal combiner 414, the processed signals are combined to form a combined signal. The signal combiner can include, but is not limited to, a signal adder. Subsequent to forming the combined signal, the signal combiner 414 communicates the same to the hardware entities 416 for further processing. The hardware entities 416 can include, but are not limited to, filters and amplifiers. After processing the combined signal, the hardware entities 416 communicate the same to the demodulator for demodulation.

Figure 5:
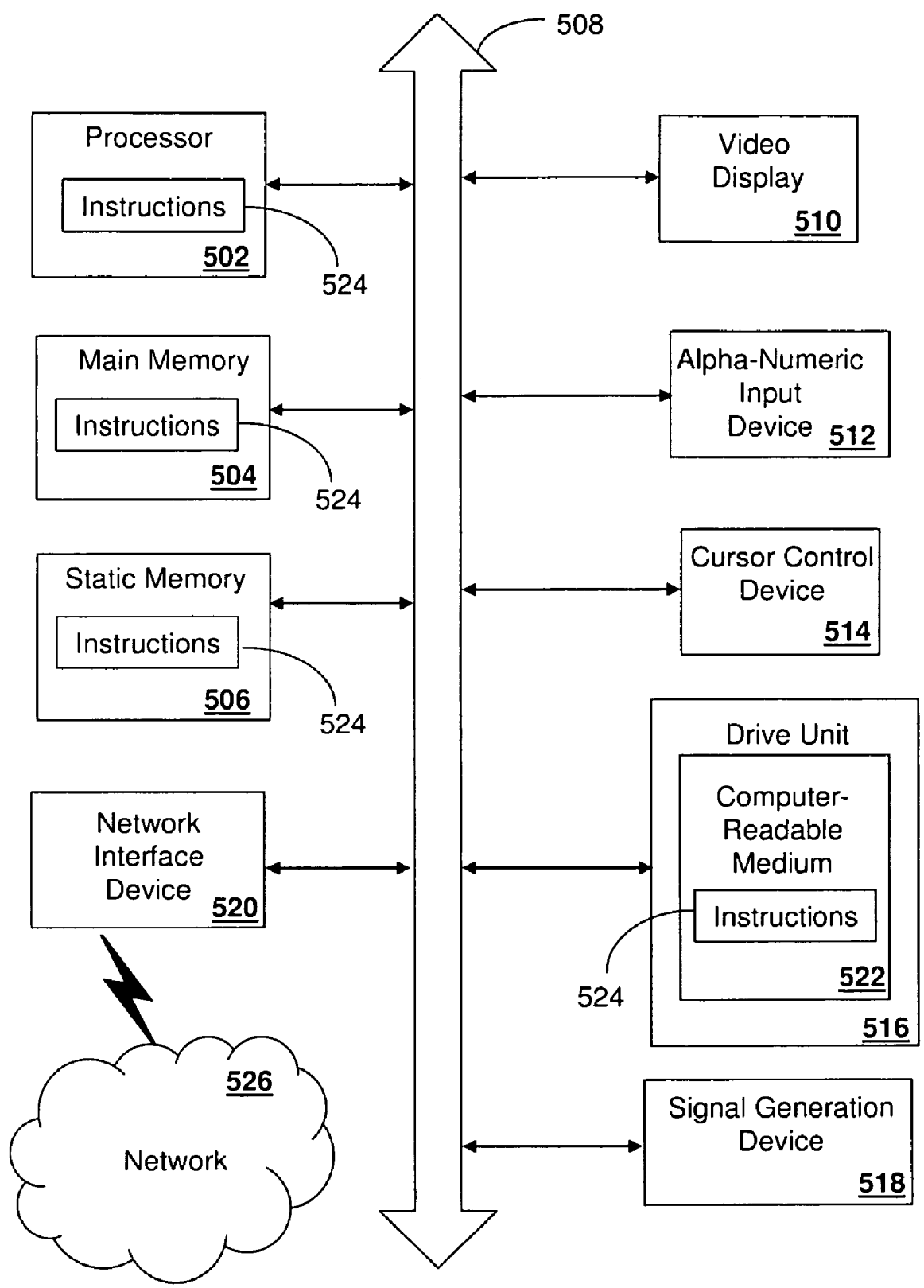
FIG. 5 is a schematic view of a computer system within which a set of instructions operate according to an embodiment of the present invention.

FIG. 5 is a schematic diagram of a computer system 500 for executing a set of instructions that, when executed, can cause the computer system to perform one or more of the methodologies and procedures described above and below. For example, a computer system 500 can be implemented to perform the various tasks of the transmit side 202 and/or the receive side 204 the ACS 102, including calculation of complex weights $w_1$, $w_2$, $w_3$, as described above, or calculation of phase center locations, as described below. In some embodiments, the computer system 500 operates as a single standalone device. In other embodiments, the computer system 500 can be connected (e.g., using a network) to other computing devices to perform various tasks in a distributed fashion. In a networked deployment, the computer system 500 can operate in the capacity of a server or a client developer machine in server-client developer network environment, or as a peer machine in a peer-to-peer (or distributed) network environment.

The computer system 500 can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 500 can include a processor 502 (such as a central processing unit (CPU), a graphics processing unit (GPU, or both), a main memory 504 and a static memory 506, which communicate with each other via a bus 508. The computer system 500 can further include a display unit 510, such as a video display (e.g., a liquid crystal display or LCD), a flat panel, a solid state display, or a cathode ray tube (CRT)). The computer system 500 can include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 can include a computer-readable storage medium 522 on which is stored one or more sets of instructions 524 (e.g., software code) configured to implement one or more of the methodologies, procedures, or functions described herein. The instructions 524 can also reside, completely or at least partially, within the main memory 504, the static memory 506, and/or within the processor 502 during execution thereof by the computer system 500. The main memory 504 and the processor 502 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 524 or that receives and executes instructions 524 from a propagated signal so that a device connected to a network environment 526 can send or receive voice and/or video data, and that can communicate over the network 526 using the instructions 524. The instructions 524 can further be transmitted or received over a network 526 via the network interface device 520.

While the computer-readable storage medium 522 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

In view of the forgoing, it should be appreciated that the cables 110a, 110b, 110c and communications links 118a, 118b, 118c (or 119a, 119d, 119c) of the communication system 100 delay signals between the ACS 102 and the antenna elements 106a, 106b, 106c. In effect, the phases of the signals are shifted during such delays thereby resulting in phasing errors. Such errors are exacerbated as the spacing between the antenna elements 106a, 106b, 106c. Phasing errors further occur as a result of environmental effects on the hardware components 102, 104a, 104b, 104c of the MEAS 150. Phasing errors also occur as a result of operation delays between beamformers 308a, 308b, 308c or operation delays between beamformers 408a, 408b, 408c. The accumulated phasing errors inhibit desirable or adequate beam formation, i.e., the accumulated phasing errors can result in the steering of the radiated central beam 112 in a direction other than the direction 116 of the object of interest 108. Unfortunately such phasing errors are generally not easily modeled and the locations of phase centers of the antenna elements 106a, 106b, 106c are generally difficult to ascertain using conventional modeling of the MEAS 151.

Differential Distance Calculation

In the various embodiments of the present invention, the phase center locations can be calculated based on differential distances for the antenna elements, as described below. The term "differential distance", as used herein, refers to the additional distance a wavefront needs to travel to reach a phase center of the second antenna element after the wavefront has reached a phase center of the first antenna element. The term "phase center", as used herein with respect to an antenna element, refers to a point from which the electromagnetic radiation generated by the antenna element spreads spherically outward, with the phase of the signal being generally equal at any point on the sphere.

Figure 6A:
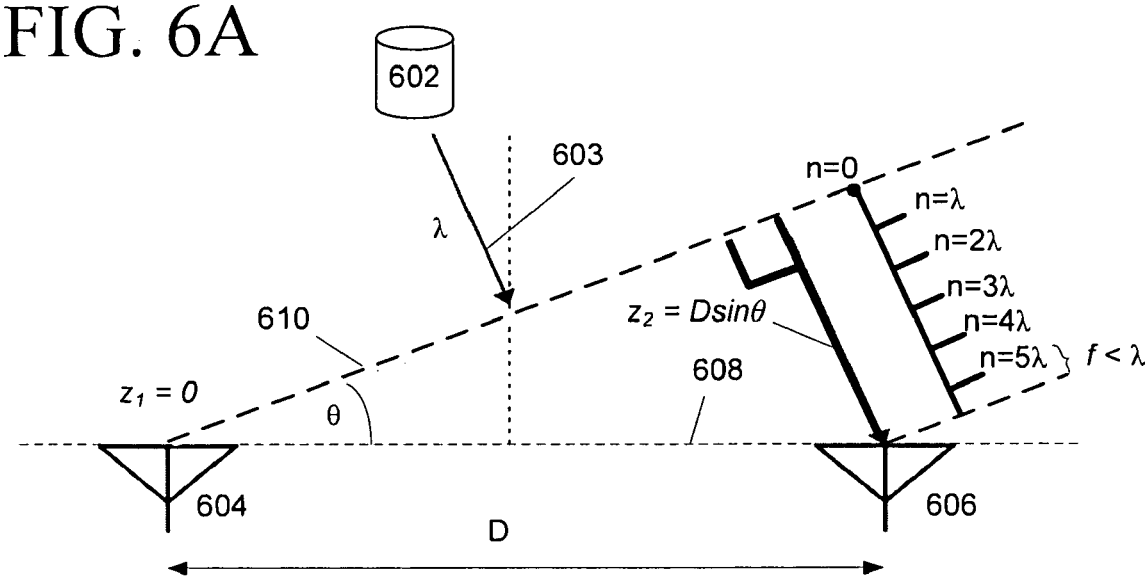
FIGS. 6A and 6B are schematic views of possible causes of differential distances between antenna elements in an array.

In general, a differential distance between antenna elements is typically associated with a particular angle of arrival (AOA) of the signal at the antenna elements. That is, the angle of the wavefront of the received signal with respect to a plane containing the first and second antenna elements. This is conceptually illustrated in two dimensions in FIG. 6A. In general, unless an object 602 transmits a signal 603 at a wavelength λ towards first 604 and second 606 antenna elements separated by a distance D in a direction normal to the plane 608 defined by the phase centers of the first 604 and second 606 antenna elements, the wavefront 610 of the signal 603 will arrive at the plane 608 at some AOA (θ) that is greater or less than zero. As a result, as shown in FIG. 6A, the wavefront 610 will reach the first antenna element 604 at a first time and at a later time the wavefront 610 will reach the second antenna element 606. As a result, the portion of the wavefront 610 reaching the second antenna element 606 travels an additional distance D sin θ, a differential distance $z_2$.

Figure 6B:
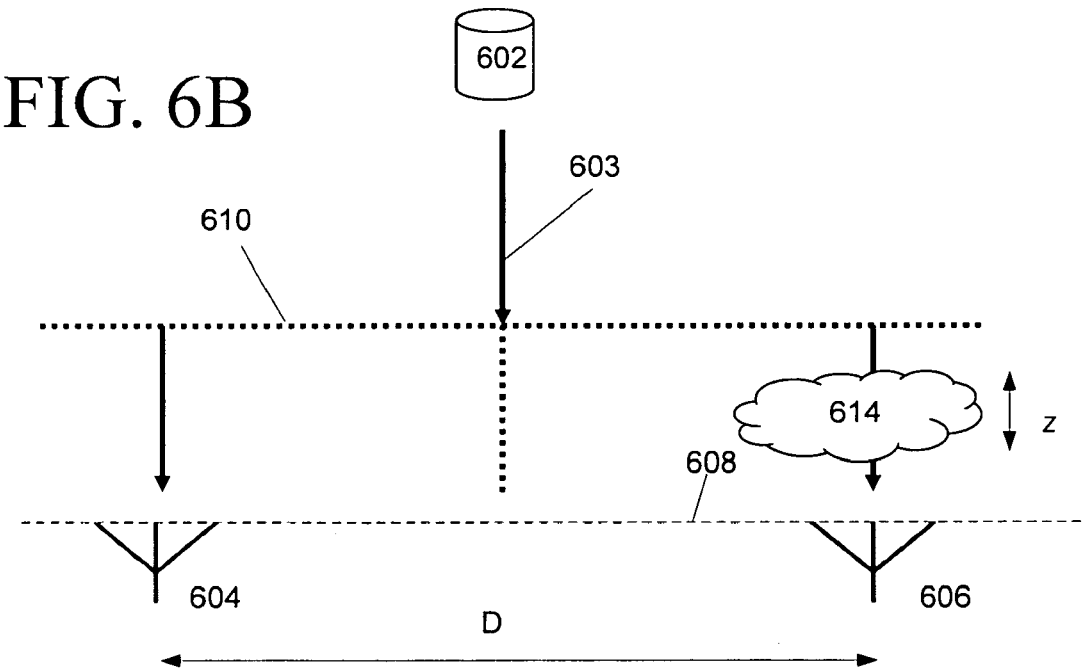

Although the differential distance Z could be estimated based on θ and D, the actual differential distance is affected by other factors, resulting in a difference between the estimated and actual differential distances. For example, value of D may not be accurately known. In another example, variation in the actual differential distance can also arise if objects are present in the path of the portion of the signal reaching at least one of the antenna elements. For example, as shown in FIG. 6B, the portion of the signal reaching the second antenna element 606 may pass through a cloud 614 or other atmospheric disturbance or phenomena. As a result, even if the signal 603 is transmitted normal to the plane 608 defined by the phase centers of the first 602 and second 604 antenna elements, as shown in FIG. 6B, the wavefront will propagate differently through cloud 614. This difference in propagation effectively operates as a differential distance Z.

For illustrative purposes, the various embodiments of the present invention will be described with respect to first and second antenna elements, where one of the antenna elements is a reference element. However, the various embodiments of the present invention are not limited to determining the differential distances with respect to a reference antenna element. Rather, in some embodiments of the present invention, a reference location can be utilized instead and each antenna element in the array will be associated with a differential distance with respect to the reference location. For example, with respect to FIGS. 6A and 6B, the first antenna element 602 can comprise a location with or without an antenna element. Although any reference location can be selected, in some embodiments of the present invention, the reference location is selected to be within the antenna array.

As previously described, the phase of a signal will vary as it travels through a communications medium (e.g., air or space). If a signal travels a differential distance Z, as described above, the signal 603 will undergo additional phase variation or phase propagation prior to reaching the second antenna element 606 as compared to the first antenna element 604. This difference can generally be expressed as n+f wavelengths, where n is the number of whole or complete wavelengths and f is the number of fractional wavelengths (f<λ) the phase of the signal varies over the differential distance. For example, as shown in FIG. 6A, the signal 603 undergoes a phase propagation of 5λ+f over the differential distance z2. This quantity can also be expressed as $z_2/\lambda_{RX}$, where $z_2$ is the differential distance for the second antenna element and $\lambda_{RX}$ is the wavelength of the signal being received.

The difference in phase (n+f) can generally be modeled using the steering vector ($\vec{v}$). A "steering vector", as known to one or ordinary skill in the art, is an array describing the properties of the signal at each antenna element. A steering vector for two elements, as shown in FIG. 6A, can generally be expressed as shown below in Equation (1):

$$\vec{v} = \begin{bmatrix} amplitude_1 e^{j(\omega t - \beta z_1)} \\ amplitude_2 e^{j(\omega t - \beta z_2)} \end{bmatrix} \quad (1)$$

where ω is a radian frequency of the signal, β is a wave number of the signal expressed as $2\pi/\lambda_{RX}$, and $z_i$ is differential distance for each element.

For large arrays of reflector elements (i.e., greater than 200's of meters), the steering vector can be rewritten as a product of signal amplitude, frequency, and phase, as shown in below in Equation (10):

$$\vec{v} = \begin{bmatrix} amplitude_1 \\ \vdots \\ amplitude_k \end{bmatrix} \otimes \begin{bmatrix} e^{j\omega t} \\ \vdots \\ e^{j\omega t} \end{bmatrix} \otimes \begin{bmatrix} e^{-j\beta z_1} \\ \vdots \\ e^{-j\beta z_k} \end{bmatrix} \quad (2)$$

where $$\begin{bmatrix} e^{-j\beta z_1} \\ \vdots \\ e^{-j\beta z_k} \end{bmatrix}$$

is the array factor, $$\beta = \frac{2\pi}{\lambda}, z = D\hat{u},$$

and $$\hat{u} = \begin{bmatrix} \sin\theta_i \cos\phi_i \\ \sin\theta_i \sin\phi_i \\ \cos\theta_i \end{bmatrix}$$

for a signal, i, which allows the steering vector phase term to specify an array factor vector (AF), to be used model the phase difference between the antenna elements. In the 2-element case depicted in FIG. 6A:

$$AF \triangleq \begin{bmatrix} e^{-j\beta z_1} \\ e^{-j\beta z_2} \end{bmatrix} = \begin{bmatrix} 1 \\ e^{-j\frac{2\pi}{\lambda}D\sin\theta} \end{bmatrix} \quad (3)$$

Since $z_1 = D \sin \theta = 0$ for the first element 604 (i.e., the reference element in the array) and $e^0 = 1$.

This term is a function of array frequency $1/\lambda_{RX} = f_{RX}/c$ (where c is the speed of light) and the distance or separation between the elements, D. Therefore, assuming that the first element is used as a phase reference, then the fractional phase difference (f) at the second antenna element is described by Equation (4):

$$\mod 2\pi\left(\frac{z}{\lambda_{Rx}}\right) = \mod 2\pi\left(\frac{D\sin\theta}{\lambda_{Rx}}\right) = f \quad (4)$$

where f is the modeled fractional part of a wavelength at the receive frequency, $f_{Rx}$ for the second antenna element. After calculating the fraction portion, f using the BSS process described below, the whole number of wavelengths, n can be calculated as shown below:

$$\frac{D\hat{u}}{\lambda_{Rx}} = \frac{z}{\lambda_{Rx}} = n + f \quad (5)$$

where $$\hat{u} = \begin{bmatrix} \sin\theta_i \cos\phi_i \\ \sin\theta_i \sin\phi_i \\ \cos\theta_i \end{bmatrix}$$

is a unit line of sight vector for a particular signal, i. Using Equation (13), the modeled differential distance can be replaced by the true differential distance.

In an array of very widely spaced elements, an exact whole number of wavelengths typically cannot be measured. However, the actual fractional phase difference f can be calculated by generated a steering vector for the actual signal using an adaptive blind source separation (BSS) algorithm, as described below. Therefore, even though the actual value of n is generally unascertainable, the actual value of f can be combined with the estimated value of n to allow calculation of a differential distance value for the second antenna element with increased accuracy. This is conceptually described below with respect to FIGS. 7A-7C.

Figure 7A:
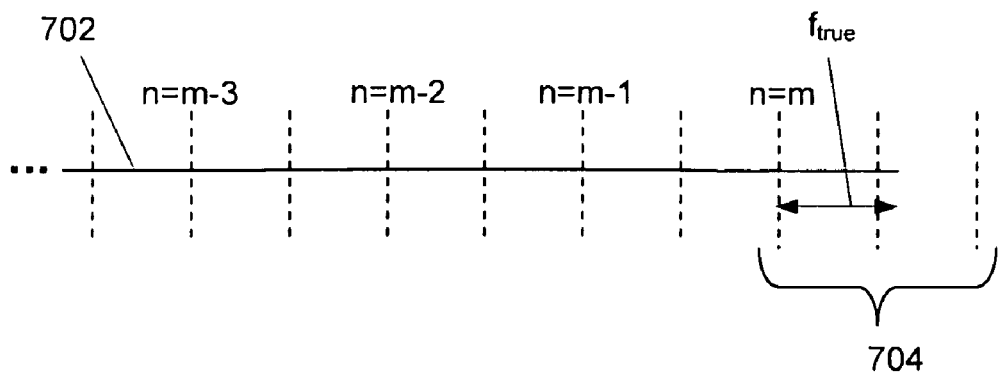
FIG. 7A is a exemplary diagram showing actual phase propagation along a differential distance between a first and a second antenna element in an array and a residual phase value computed according to an embodiment of the present invention.

FIG. 7A shows a schematic of phase propagation 702 of a signal along a differential distance between a first and a second antenna element. As previously described, as the signal 702 traverses the differential distance, the signal will undergo some amount of phase propagation $n_{true} + f_{true}$, where $n_{true}$ is equal to an unknown number of whole wavelengths m. Unfortunately, determining a value for m for a received signal is non-trivial. When array element spacing is on order of thousands wavelengths, it is difficult to determine phase to a few degrees, since this amounts to measuring to a few parts per million accuracy. For example, for X-band frequencies, a wavelength is approximate an inch and so accuracies of about 1/100 of an inch are generally needed over an antenna element separation distance of 200 to 300 feet. Although, many surveying techniques (including laser metrology) are accurate to less than one inch over this distance (about one full wavelength), measuring such a delay using such an external source would require a bandwidth of 2 GHz or more to obtain reliable results. This is 3 to 4 orders of magnitude wider than most deep space downlinks. (Although quasars have such bandwidth, they are generally very weak and would require long integration times during which time, array parameters could change.) Although using measurement data is generally prohibitive, since the phase of the as-received signal can generally always be measured, a value for $f_{true}$, commensurate with the final portion 704 of the phase propagation 702 of the as-received signal, can generally be determined using an adaptive BSS algorithm, as described below.

Figure 7B:
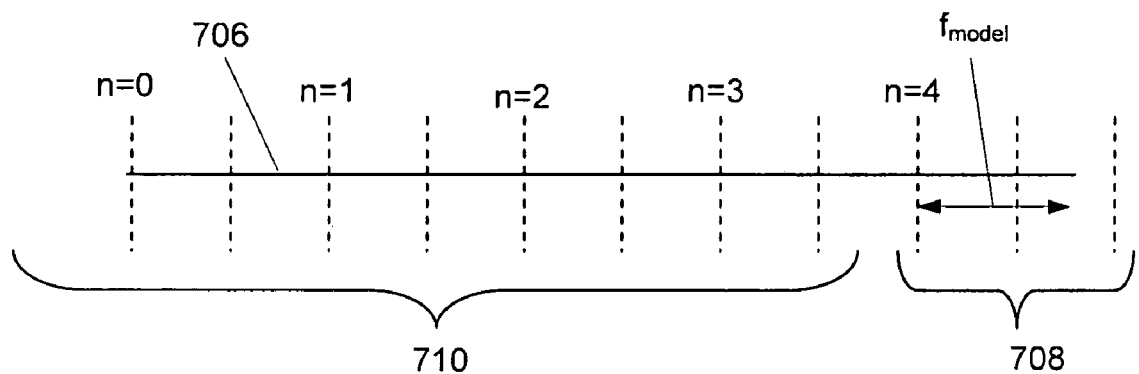
FIG. 7B is a exemplary diagram showing estimated phase propagation along a differential distance between a first and a second antenna element in an array computed according to an embodiment of the present invention.

Additionally, both $n_{true}$ and $f_{true}$ can be modeled to provide modeled values $n_{model}$ and $f_{model}$ for estimating a differential distance, as described above, for the signal in FIG. 7A. FIG. 7B shows a schematic of estimated phase propagation 706 of the signal in FIG. 7A. Although the estimated phase propagation 706 can be used to determine an estimated differential distance based on $n_{model}$ and $f_{model}$, the transmission medium variation and antenna element location errors result in a variation of the value of a $f_{model}$ as compared to $f_{true}$. However, even though the portion 708 of the estimated phase propagation 706 associated with $f_{model}$ may not be accurate, the portion 710 of the estimated phase propagation 740 can be assumed to represent the number of whole wavelengths for the actual phase propagation 702 in FIG. 7A with a high degree of accuracy. Generally, such an assumption can be made when the error in the location of the antenna elements is within a wavelength. Therefore, in the various embodiments of the present invention, to provide an accurate estimate of the phase propagation and therefore allow computation of an accurate differential distance, the differential distance can be estimated using a combination of $n_{model}$ and $f_{true}$.

Figure 7C:
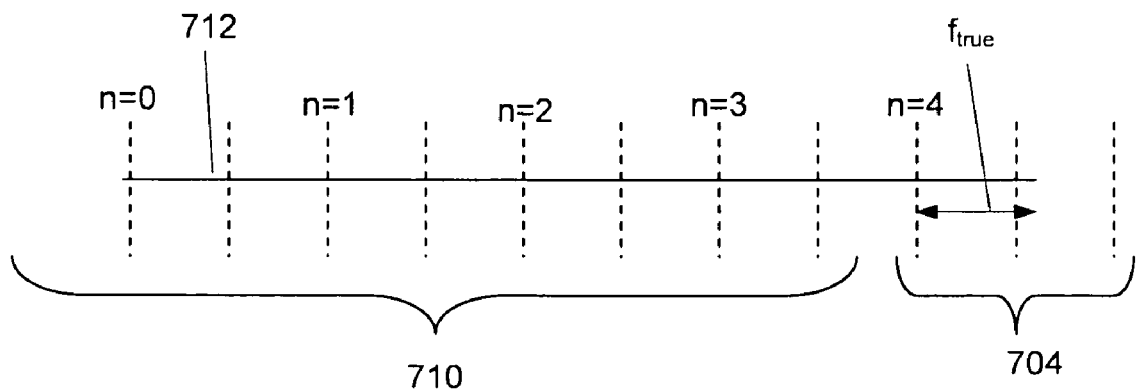
FIG. 7C is a exemplary diagram showing an adjusted or "true" phase propagation along a differential distance between a first and a second antenna element in an array computed according to an embodiment of the present invention.

For example, FIG. 7C shows a schematic of a "true" phase propagation 712 of the signal in FIG. 7A. To construct phase propagation 712, the estimated phase propagation 706 is selected and the portion 708 is replaced with portion 704 from phase propagation 702. As a result, since $n_{model}$ is assumed to be correct and the $f_{true}$ (based on portion 704) is known, a more accurate estimate of the differential distance can be performed.

In the exemplary replacement process shown in FIGS. 7A-7C above, it is assumed that the $n_{model}$ and $n_{true}$ have the same number of wavelengths. However, the $n_{model}$ value can also be higher or lower than the $n_{true}$ value. Accordingly, to obtain a correct phase propagation (i.e., correct values for computing the sum of $n_{model}$ and $f_{true}$), some additional considerations can be required. If it is assumed that the phase propagation values for the modeled ($n_{model}$, $f_{model}$) and "true" ($n_{true}$, $f_{true}$) phase propagation differ by less than one wavelength, then the difference between the modeled and actual differential distances for an antenna element can be expressed as:

$$|z_{model} - z_{true}| < \frac{1}{2}\lambda \qquad (6)$$

Therefore, the difference in phase ($\phi = z/\lambda$) can be expressed as:

$$|\phi_{model} - \phi_{true}| < \frac{1}{2} \Rightarrow \left|\frac{z}{\lambda}\text{model} - \frac{z}{\lambda}\text{true}\right| < \frac{1}{2} \qquad (7)$$

or $$|(n_{model} + f_{model}) - (n_{true} + f_{true})| = \qquad (8)$$
$$|(n_{model} - n_{true}) - (f_{true} - f_{model})| < \frac{1}{2}$$

Setting $n_{model} - n_{true} = k$ and $f_{true} - f_{model} = p$, Equation (15) reduces to:

$$|k - p| < \frac{1}{2} \qquad (9)$$

where $k \in \{-1, 0, 1\}$.

Using $p = (f_{true} - f_{model})$ and $k = (n_{model} - n_{true})$ $n_{true}$ is obtained since $n_{true} = (n_{model} - k)$ and used to correct the modeled differential distance.

The method of replacement in FIGS. 7A-7C will therefore vary according to the value of k. In the case of k=0, $n_{model}$ and $n_{true}$ are the same, therefore replacement can be performed as described above in FIGS. 7A-7C. In the case of k=1, this means that $n_{model}$ is greater than $n_{true}$. In such a case, the outright replacement of portion 708 with portion 704, as described in FIGS. 7A-7C would result in the n value for phase propagation 710 to be one integer wavelength too high and result in an overestimate of the differential distance. As a result, the combination step would require reducing n by one integer wavelength prior to computing the differential distance. In the case of k=−1, this means that $n_{model}$ is less than $n_{true}$. In such a case, the outright replacement of portion 708 with portion 704, as described in FIGS. 7A-7C would result in the n value for phase propagation 710 to be one integer wavelength too low and result in an underestimate of the differential distance. As a result, the combination step would require increasing n by one integer wavelength prior to computing the differential distance.

Although the determination of adding or removing wavelengths can be performed manually, the process can also be generalized as shown below. Since both $f_{true}$ and $f_{model}$ are known, k can be calculated and $n_{true}$ can be expressed as:

$$n_{true} = n_{model} - k = n_{model\_adjusted}$$

and $n_{model\_adjusted}$ can be calculated as: (10)

$$n_{model\_adjusted} = \text{floor}\frac{\frac{2\pi}{\lambda} \cdot z_{model}}{2\pi} = \text{floor}\left(\frac{f}{c} \cdot z_{model}\right) \qquad (11)$$

Using Equations (10) and (11), $n_{model}$ and $n_{true}$ can be calculated and the floor function provides the necessary adjustment to add or remove the additional wavelength. Substituting into $z_2/\lambda_{RX} = n + f$, the "true" value for $z_2$ (i.e., the differential distance for the second antenna element) can be then expressed as:

$$z_{2,true} = \lambda_{RX}(n_{true} + f_{true}) \qquad (12)$$

which can be used in equation (7) to provide phase information for the antenna element of interest.

Element Phase Center Correction

As previously described, in some embodiments, improved phase center location information for the elements in the array can be obtained based at least on computed differential distance information for the antenna elements with respect to known radiometric sources, a location or direction of the radiometric sources relative to the antenna array, and a reference antenna element in the array. This permits improved phase center location information to also be obtained based primarily on reception of signals rather than signal transmission and reception to a reference objects, as in long loop methods, and reduce or eliminate latency and availability issues and reducing or eliminating the need to go off-task.

Once the differential distances have been computed each observation, as described above, a second aspect of the present invention provides for computing actual phase center locations for each of the antenna elements during each observation. In the various embodiments of the present invention, a system of simultaneous equations is utilized to solve for the actual phase center locations. In particular, the simultaneous equations are configured to solve for k antenna elements and i observations from known sources (e.g. quasars). In order to provide a sufficient number of equations to allow a solution to be found for k phase center locations, $i \geq 3$, since each observation i provides an entire vector of k linear combinations of the 3 spatial parameters X, Y and Z. This is elaborated in detail in the following paragraphs As previously described, the actual or "true" phase of a signal received at an antenna element and a modeled value of this phase will be different due to variations in phase center location. In other words, the modeled phases at the antenna elements can be expressed as:

$$\Phi' = f(\theta_{ik}, \phi_{ik}, x_k, y_k, z_k)_{model} \qquad (13)$$

where $(\theta_{ik}, \phi_{ik})$ is the line of sight angles from antenna element, k towards observed signal, i, and $(x_k, y_k, z_k)$ is the modeled phase center location for the $k^{th}$ antenna element for all observations, i. Consequently, the actual or "true" phases are expressed as:

$$\Phi = f(\theta_{ik}, \phi_{ik}, x_k, y_k, z_k, \epsilon_{x_k}, \epsilon_{y_k}, \epsilon_{z_k})_{true} \qquad (14)$$

where $(\epsilon_{x_k}, \epsilon_{y_k}, \epsilon_{z_k})$ is the error in the modeled element location for antenna element, k. Therefore, to find a better estimate for the antenna element phase center locations, signals from known locations are observed at different line of sight angles. The various embodiments of the present invention utilize the "true" differential distance data to minimize the difference between $\Phi$ and $\Phi'$.

As described above with respect to Equation (2), the AF vector in the steering vector describes the phase component of the signal received at each antenna element. Using the form for the phase component for one incoming signal, i, $$e^{-j\frac{2\pi}{\lambda}D\hat{u}}$$

as shown in Equation (14):

$$D = \begin{bmatrix} x_1 & y_1 & z_1 \\ x_2 & y_2 & z_2 \\ \vdots & \vdots & \vdots \\ x_k & y_k & z_k \end{bmatrix} \qquad (15)$$

where D is a matrix containing the modeled antenna element phase center locations for each element, k, and $\hat{u}$, is the unit direction vector for the $i^{th}$ observation $$\hat{u} = \begin{bmatrix} \sin\theta_i \cos\phi_i \\ \sin\theta_i \sin\phi_i \\ \cos\theta_i \end{bmatrix}. \qquad (16)$$

This allows $\Phi'$ to be expressed as:

$$\Phi' = \ln[e^{j\frac{2\pi}{\lambda}D\hat{u}}] \qquad (17)$$

Similarly, $\Phi$ which contains the errors in the phase center locations, can be expressed as:

$$\Phi = \ln[e^{j\frac{2\pi}{\lambda}AX}] \qquad (18)$$

where X is a matrix $(D+E_D)^T$ containing the actual antenna element phase center locations:

$$X = (D + E_D)^T \qquad (19)$$

$$= \left( \begin{bmatrix} x_1 & y_1 & z_1 \\ x_2 & y_2 & z_2 \\ \vdots & \vdots & \vdots \\ x_k & y_k & z_k \end{bmatrix} + \begin{bmatrix} \epsilon_{x1} & \epsilon_{y1} & \epsilon_{z1} \\ \epsilon_{x2} & \epsilon_{y2} & \epsilon_{z2} \\ \vdots & \vdots & \vdots \\ \epsilon_{xk} & \epsilon_{yk} & \epsilon_{zk} \end{bmatrix} \right)^T$$

$$= \begin{bmatrix} x_1 + \epsilon_{x1} & y_1 + \epsilon_{y1} & z_1 + \epsilon_{z1} \\ x_2 + \epsilon_{x2} & y_2 + \epsilon_{y2} & z_2 + \epsilon_{z2} \\ \vdots & \vdots & \vdots \\ x_k + \epsilon_{xk} & y_k + \epsilon_{yk} & z_k + \epsilon_{zk} \end{bmatrix}^T$$

and A is the matrix containing unit direction vectors for each observation, i at each element, k:

$$A = \begin{bmatrix} \sin\theta_{11}\sin\phi_{11} & \sin\theta_{12}\cos\phi_{12} & \cos\phi_{12} \\ \sin\theta_{21}\sin\phi_{21} & \sin\theta_{22}\cos\phi_{22} & \cos\phi_{23} \\ \vdots & \vdots & \vdots \\ \sin\theta_{ik}\sin\phi_{ik} & \sin\theta_{ik}\cos\phi_{ik} & \cos\phi_{ik} \end{bmatrix}. \qquad (20)$$

Accordingly, based on the measured differential distances, and the known direction of the signal based on the line of sight angles to each element we can set the product of Equations (18) and (19) equal to a matrix, B containing the result of the BSS algorithm.

$$A * X^T = B = \begin{bmatrix} \sin\theta_{11}\sin\phi_{11} & \sin\theta_{12}\cos\phi_{12} & \cos\phi_{12} \\ \sin\theta_{21}\sin\phi_{21} & \sin\theta_{22}\cos\phi_{22} & \cos\phi_{23} \\ \vdots & \vdots & \vdots \\ \sin\theta_{ik}\sin\phi_{ik} & \sin\theta_{ik}\cos\phi_{ik} & \cos\phi_{ik} \end{bmatrix} * \qquad (21)$$

$$\begin{bmatrix} x_1 + \epsilon_{x1} & y_1 + \epsilon_{y1} & z_1 + \epsilon_{z1} \\ x_2 + \epsilon_{x2} & y_2 + \epsilon_{y2} & z_2 + \epsilon_{z2} \\ \vdots & \vdots & \vdots \\ x_k + \epsilon_{xk} & y_k + \epsilon_{yk} & z_k + \epsilon_{zk} \end{bmatrix}^T$$

$$= \begin{bmatrix} b_{11} & b_{12} & b_{12} \\ b_{21} & b_{22} & b_{23} \\ \vdots & \vdots & \vdots \\ b_{ik} & b_{ik} & b_{ik} \end{bmatrix}$$

Where B contains the actual fractional phase differences, f calculated by generating a steering vector for the actual signal using an adaptive BSS algorithm described below. Another way of saying this is that it returns $\mod_{2\pi}(\vec{d}\hat{u})$ $b_{ik}$ is the phase difference for the $i^{th}$ observation at the $k^{th}$ element.

$$b_{ik} = \vec{d}^T \hat{u} \qquad (22)$$

$$= [x_k + \epsilon_{xk} \quad y_k + \epsilon_{yk} \quad z_k + \epsilon_{zk}] * $$

$$\begin{bmatrix} \sin\theta_{ik}\sin\phi_{ik} \\ \sin\theta_{ik}\cos\phi_{ik} \\ \cos\phi_{ik} \end{bmatrix}$$

or as written in Equation (20):

$$b_{ik} = \hat{u}^T \vec{d} \quad (23)$$

$$= [\sin\theta_{ik}\sin\phi_{ik} \quad \sin\theta_{ik}\cos\phi_{ik} \quad \cos\phi_{ik}] * \begin{bmatrix} x_k + \varepsilon_{xk} \\ y_k + \varepsilon_{yk} \\ z_k + \varepsilon_{zk} \end{bmatrix}$$

The matrix X can then be solved by conventional matrix methods to compute $X=(A^TA)^{-1}A^TB$. Although any plurality of AOAs can be used to determine the phase center locations for the antenna elements, in some embodiments of the present invention, at least three AOAs are needed to accurately determine the phase center locations.

BSS Algorithm for Computing $f_{true}$

As previously described, measurement of $f_{true}$ can be performed using an adaptive BSS algorithm, including open loop and closed loop methods. For example, in a closed loop method, the standard system covariance matrix, $R_x$ for computing the steering vector, is formed from the expected value of the outer product of the input signal vector. If $\vec{x}(t)$ is the vector of inputs from the array elements, then $$\vec{x}(t) = \begin{bmatrix} \sigma_1(t) \\ \sigma_2(t) \\ \vdots \\ \sigma_n(t) \end{bmatrix} + \sum_{i=1,k} m_i(t)\sqrt{P_i}\,\vec{v}_i \quad (24)$$

where $\sigma(t)$ is the thermal noise for a given input, $m_i(t)$ is the complex modulation for a particular source, P is the source's power and $\vec{v}_i(t)$ is its steering vector. The covariance matrix is calculated by forming the vector outer product and taking an expected value, denoted by E( ) and provides:

$$R_x = E(\vec{x}^*(t)\vec{x}^T(t)) = \sigma^2 + \Sigma P_i \vec{v}_i^* \vec{v}_i^T \quad (25)$$

The thermal noise matrix is generally of the following form, $$\sigma^2 = \begin{bmatrix} \sigma_1^2 & & & \\ & \sigma_2^2 & & \\ & & \ddots & \\ & & & \sigma_n^2 \end{bmatrix} \quad (26)$$

while the complex modulation function $m_i(t)$ is defined so that $E[m_i^*(t)m_i(t)]=1$ for a given source and that $E[m_i^*(t)m_j(t)]=0$ for source-to-source cross correlations.

Inspection of $R_x$ shows that the expected value operation removes all source-to-source vector inner and outer cross products. Consequently, one is unable to 'go back' and determine the various signal steering vectors exactly without additional information.

Alternatively, a pair of similar matrices with different information content can be solved simultaneously for the steering vectors. The necessary matrices are obtained without the need for calibration, thus general array control can be accomplished without calibration. Subsequent AOA determination can then proceed on a source-by-source basis, with AOA precision dependent upon calibration, but with graceful degradation versus errors and without catastrophic algorithm failure. Furthermore, the nonuniform thermal matrix can be removed so that the solutions are unbiased, even for very weak LPI signals.

The standard covariance matrix $R_x$ is selected as the primary matrix. At least three methods are known for obtaining a second similar matrix. Probably the simplest conceptually is the delayed covariance, which we refer to as $R_\tau$. One has $$R_\tau = E[x^*(t-\tau)x^T(t)] \quad (27)$$

$$= h(\tau)\sigma^2 + \sum_{i=1,k} q_i(\tau)P_i \vec{v}_i^* \vec{v}_i^T$$

In the above, the scalar $h(\tau) \leq 1$. The complex constant, $|q_i(\tau)| \leq 1$ and is dependent upon the source's carrier frequency and time delay. For a narrow band source, $q_i(\tau)$ is simply a phase shift, but sources with modulation also suffer a correlation amplitude loss with increasing delay. Different modulation types produce different q functions. For example, PSK modulation has a q value that linearly decreases with delay, becoming zero at an inverse bandwidth while the q for bandlimited white noise follows a sin(x)/x variation. The most important discriminant is the phase of q, which in a practical signal environment is virtually always different from source to source. In a Doppler shifted environment, even phase locked sources at different locations will display frequency offsets and thus different q values. Note that $R_\tau(0)=R_x$ (zero correlation delay). Delay values approaching an inverse bandwidth are effective in many applications.

To address the matrices having the diagonal noise terms, consider solving the eigenvalue equation $$R_\tau e = \lambda R_x e. \quad (28)$$

After regrouping terms and simplifying, $$\sum_{i=1,k} \vec{v}_i^* [\lambda - q_i(\tau)] P_i(v_i^T e) + (\lambda - h)\sigma^2 e = 0. \quad (29)$$

Again, two solution types are obtained. The solution of interest is from the noise sub-space, and is characterized by eigenvectors orthogonal to all of the steering vectors simultaneously. For an N input array and k signals, there are (N–k) such eigenvectors, and they will all have repeat eigenvalues, $\lambda=h$. Multiplying $R_x$ by one of the noise sub-space eigenvectors yields $$\vec{u} = R_x e = \sigma^2 e. \quad (30)$$

All signal subspace matrices are eliminated from the product because e is orthogonal to all steering vectors. Expanding u provides:

$$\vec{u} = \begin{bmatrix} u_1 \\ u_2 \\ \vdots \\ u_{n1} \end{bmatrix} = \begin{bmatrix} \sigma_1^2 e_1 \\ \sigma_2^2 e_2 \\ \vdots \\ \sigma_n^2 e_n \end{bmatrix}. \quad (31)$$

Since u and e are known, one can solve for the $\sigma_1^2$ on a term-by-term basis, thus $\sigma_1^2$ is determined. One may now remove $\sigma_1^2$ and $\sigma_{\tau 1}^2$ from $R_x$ and $R_\tau$ respectively, obtaining a set of singular matrices designated T. Note that one degree of freedom is required to solve for $\sigma^2$.

Once the noise terms have been determined, a fundamental process for solving for unbiased steering vector using singular matrices can be used. Let $$T_x = R_x - \sigma^2 = \sum_{i=1,k} P_i \vec{v}_i^* \vec{v}_i^T, \quad (32)$$

and $$T_\tau = R_\tau - h(\tau)\sigma^2 = \sum_{i=1,k} q_i(\tau) P_i \vec{v}_i^* \vec{v}_i^T. \quad (33)$$

If the generalized eigenvectors and eigenvalues are found of the above set of equations. One has:

$$T_\tau e = \lambda T_x e. \quad (34)$$

Expanding Equation (22) therefore provides:

$$\lambda \sum_{i=1,k} P_i \vec{v}_i^* (\vec{v}_i^T e) = \sum_{i=1,k} q_i(\tau) P_i \vec{v}_i^* (\vec{v}_i^T e). \quad (35)$$

which after collecting terms and regrouping yields, $$\sum_{i=1,k} \vec{v}_i^* [\lambda - q_i(\tau)] P_i (\vec{v}_i^T e) = 0. \quad (36)$$

Since the individual steering vectors are independent, each of the terms in the summation must be zero independently. There are two types of solutions. For the trivial solution, $(\vec{v}_i^T e) = 0$ for all steering vectors and the eigenvalue is indeterminate. This is the null sub-space of this system of equations. For an N input array and k signals, this space has dimension (N−k). The second type of solution has $(\vec{v}_i^T e) = 0$ for all steering vectors but one, $v_j$. This remaining term is then satisfied by an associated eigenvalue such that $$\lambda_j = q_j(\tau) \quad (37)$$

This is the signal sub-space of the system of equations, and it has dimension k. The $j^{th}$ steering vector is then obtained by forming the product $$T_x e_j = P_j \vec{v}_j (\vec{v}_j^T e_j) = (scalar) \vec{v}_j. \quad (38)$$

Normalization removes the scalar, then one can solve for $P_j$ since all other terms in the expression are known.

The preliminary step of solving for the noise covariance matrix in (31) and removing it in (32) are very important steps in obtaining the exact result of (38). In a practical system, the diagonal noise matrix always has different values for each input and thus cannot equal the identity matrix times a scalar. Eigenvector decomposition of a practical noise covariance matrix in combination with signal covariances can not be decomposed into exact signal and noise sub-spaces unless the diagonal noise matrix equals the identity times a scalar. Thus, without correction, competing algorithms such as MUSIC (MUltiple SIgnal Characterization) produce biased steering vector estimates. Practically, this limitation prevents those algorithms from finding and characterizing weak signals.

Although one procedure for obtaining a steering vector has been described above in detail, embodiments of the present invention are not limited in this regard. In other embodiments of the present invention, other methods for obtaining a second covariance matrix are also suitable, including polarization and fourth order co-variance methods, such as cumulant-based methods.

Figure 8:
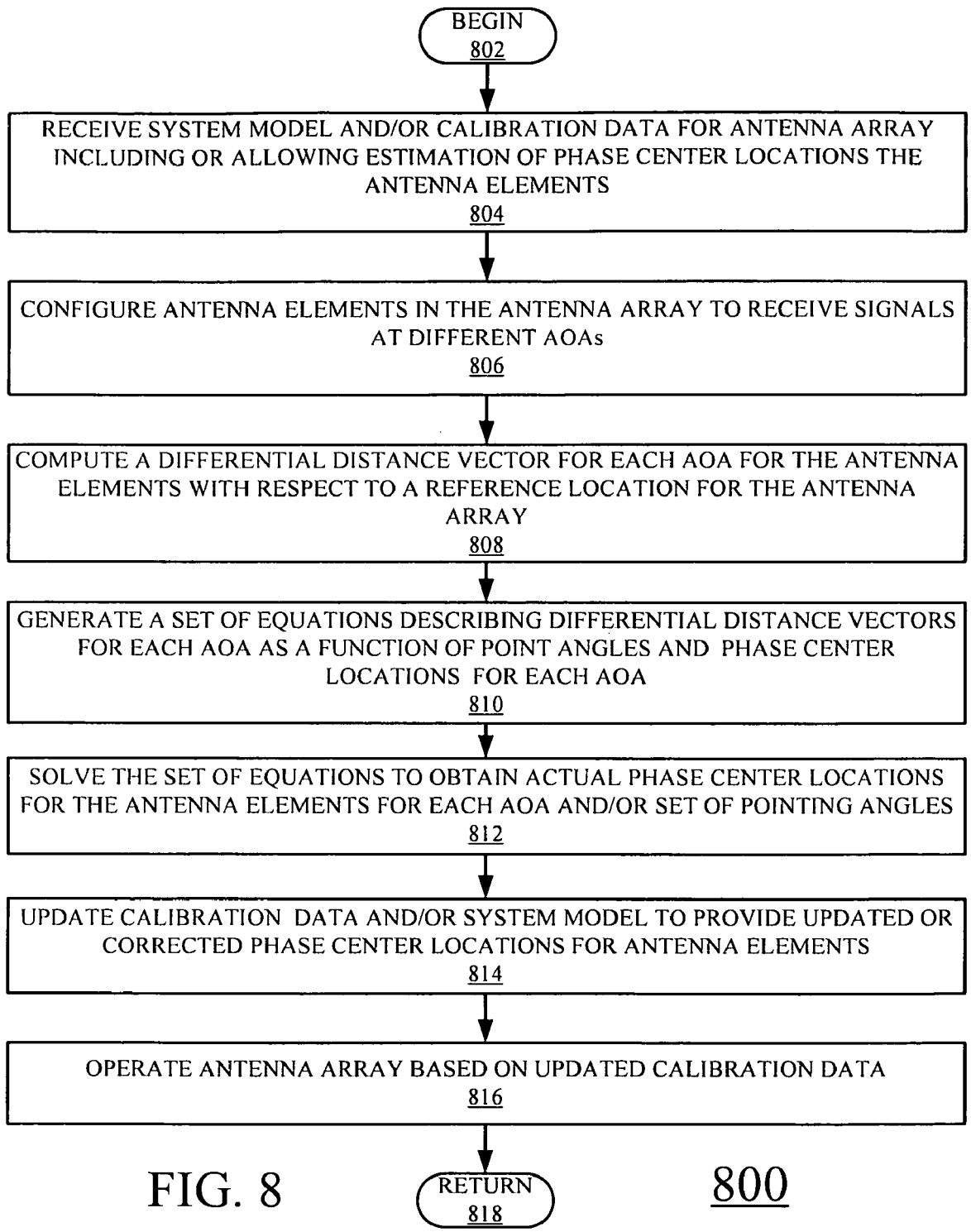
FIG. 8 is a flowchart of steps in an exemplary method for operating an array of antenna element according to an embodiment of the present invention.

FIG. 8 is a flowchart of steps in an exemplary method 800 for operating an array of antenna elements. Method 800 begins at step 802 and continues on to step 804. In step 804, configuration data for the array of antenna elements can be received, such as a system model or calibration data. The system model and/or the calibration data provide a description or configuration data for the array that includes or allows estimation of the phase center locations and differential distances for the various elements in the array. The estimation of the phase center location and differential distances can be based purely on the behavior and/or orientation of the antenna element. However, the present invention is not limited in this regard and the phase center locations can also be based on estimates of phase errors in various portions of the array.

Concurrently or subsequent to step 804, the antenna elements in the array can be configured in step 806 to receive signals at a plurality of different AOAs. That is, as described above from one or more objects at a plurality of locations and at different line of sight angles. For example, as previously described, the antenna elements can be configured to collect signals from different radiometric celestial objects. Furthermore, in the case of directional antenna elements, the antenna elements can be pointed in the direction of the object. For example, in the case of a reflector-type antenna element, the AOA can be based on an elevation and azimuth for the reference object relative to the antenna array.

For each of the signals received in step 806, a differential distance vector for each antenna element, relative to a reference location, can be calculated in step 808. In the various embodiments of the present invention, the reference location can be anywhere, including the location of an antenna element. Once the differential distances are obtained in step 808, a system of equations can be generated in step 810. In particular, the system of equations provides differential distance vectors as a function of phase center locations and associated pointing angles, as described above with respect to Equations (18) to (22). The system of equations can then be solved in step 812 using the differential distance vectors calculated in step 808 and the pointing angles used in step 806 to obtain the phase center locations, relative to the reference antenna for each set of pointing angles. Afterwards, in step 814, the calculated values for the phase centers, as a function of AOA, can be used update or provide corrections to the configuration data obtained in step 804. Based on these updates and corrections, the antenna array can then be operated in step 816. Previous processing can then be resumed in step 818, including repeating steps 804-818.

The transmission phase correction and phase location calculation processes have been described with the assumption that a single narrowband signal has been received. However, the various embodiments of the present invention are not limited in this regard. In some embodiments, multiple signals can be received along the same central beam. The use of multiple signals allows multiple observations and differential distance calculations to be performed, allowing increased accuracy in the computation of the phase adjustments needed for the antenna elements. Furthermore, in some embodiments, wideband signals can also be utilized. In such embodiments, Frequency-domain analysis synthesis filtering methods can be utilized to divide the wideband signals into a plurality of narrowband ranges. Accordingly, in such embodiments, the number of observations is effectively increased, also increasing the number and accuracy of differential distances calculated. Additionally, such an analysis can be necessary when the error in the location of the antenna elements is greater than one wavelength. Furthermore, when multiple adjacent bands are analyzed, it is also possible to directly calculate the delay at each antenna element and calculate the phase center locations based on such delays instead.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for operating a communications system comprising an antenna array having a plurality of antenna elements, the method comprising:
    receiving a plurality of signals at the plurality of antenna elements, the plurality of signals arriving at the array of antenna elements at a plurality of angles of arrival (AOAs) with respect to a reference location;
    calculating a plurality of differential distance vectors between the plurality of antenna elements and the reference location, each of the plurality of differential distance vectors associated with one of the plurality of AOAs and at least one of the plurality of signals;
    obtaining a plurality of actual phase center locations for the plurality of antenna elements based on the plurality of differential distance vectors and the plurality of AOAs; and
    providing a correction to configuration data for the array of antenna elements based at least on the plurality of actual phase center locations.

2. The method of claim 1, further comprising selecting said reference location to be a location within said plurality of antenna elements.

3. The method of claim 1, wherein said plurality of AOAs comprises at least a first, a second, and a third AOA.

4. The method of claim 1, wherein the obtaining comprises:
    generating a system of equations describing the plurality of differential distance vectors as a function of the plurality of actual phase center locations and the plurality of AOAs; and
    solving the system of equations to compute the plurality of phase center locations.

5. The method of claim 4, wherein each of the plurality of AOAs are associated with a set of pointing angles for the plurality of antenna elements used during the receiving of each of the plurality of signals.

6. The method of claim 4, wherein said generating said system of equations further comprises selecting each of the plurality of differential distance vectors to be defined by the mathematical expression:

$$z_{ik} = [\,\sin\theta_{ik}\sin\phi_{ik} \quad \sin\theta_{ik}\cos\phi_{ik} \quad \cos\phi_{ik}\,] * \begin{bmatrix} x_k + \varepsilon_{xk} \\ y_k + \varepsilon_{yk} \\ z_k + \varepsilon_{zk} \end{bmatrix}$$

where $(\theta_{ik},\phi_{ik})$ are the pointing angles from antenna element k of the plurality of antenna elements towards observed signal i, $(x_k,y_k,z_k)$ is the modeled phase center location for antenna element k for observed signal i, and $(\varepsilon_{x_k},\varepsilon_{y_k},\varepsilon_{z_k})$ is the error in the modeled element location for antenna element, k.

7. The method of claim 1, wherein the providing comprises:
    updating a model describing the plurality of actual phase center locations as a function of the plurality of AOAs.

8. The method of claim 1, wherein the calculating the plurality of differential distance vectors for each one of the plurality of signals further comprises:
    identifying actual fractional wavelength ($f_{true}$) values for the plurality of antenna elements for the one of the plurality of signals;
    obtaining estimated phase propagation values for the plurality of antenna elements relative to the reference location based at least on the configuration data;
    estimating an actual whole wavelength ($n_{true}$) values for the plurality of antenna elements for the one of the plurality of signals based on the estimated phase propagation values and $f_{true}$ values; and
    determining differential distance vectors for the plurality of antenna elements for the one of the plurality of signals based on a sum of the $f_{true}$ values and $n_{true}$ values.

9. The method of claim 8, wherein the obtaining the estimated phase propagation values further comprises:
    calculating each of the estimated phase propagation values by modeling the first of the plurality of signals traversing an estimated differential distance between one of plurality of antenna elements and the reference location, the estimated differential distance based on the configuration data and the AOA; and calculating an estimated fractional wavelength ($f_{model}$) values and estimated whole wavelength ($n_{true}$) for the plurality of antenna elements for the first signal from the estimated phase propagation values.

10. A control system for a communications system comprising an antenna array having a plurality of antenna elements, the control system comprising:
   a storage element for receiving signal data for a plurality of signals received at the plurality of antenna elements at a plurality of angles of arrival (AOAs) with respect to a reference location, and
   a processing element communicatively coupled to the storage element, the processing element configured for:
      calculating a plurality of differential distance vectors between the plurality of antenna elements and the reference location, each of the plurality of differential distance vectors associated with one of the plurality of AOAs and at least one of the plurality of signals,
      obtaining a plurality of actual phase center locations for the plurality of antenna elements based on the plurality of differential distance vectors and the plurality of AOAs, and
      providing a correction to configuration data for the array of antenna elements based at least on the plurality of actual phase center locations.

11. The control system of claim 10, further wherein said processing element is further configured for selecting the reference location to be a location within said plurality of antenna elements.

12. The control system of claim 10, wherein storage element is further configured during said receiving for receiving signal data for at least a first, a second, and a third AOA.

13. The control system of claim 10, wherein processing element is further configured during said obtaining for:
   generating a system of equations describing the plurality of differential distance vectors as a function of the plurality of actual phase center locations and the plurality of AOAs; and
   solving the system of equations to compute the plurality of phase center locations.

14. The control system of claim 13, wherein the processing element is further configured to select a system of equations for each of the plurality of differential distance vectors defined by the mathematical expression:

$$z_{ik} = [\sin\theta_{ik}\sin\phi_{ik} \quad \sin\theta_{ik}\cos\phi_{ik} \quad \cos\phi_{ik}] * \begin{bmatrix} x_k + \varepsilon_{xk} \\ y_k + \varepsilon_{yk} \\ z_k + \varepsilon_{zk} \end{bmatrix}$$

where ($\theta_{ik},\phi_{ik}$) are pointing angles from antenna element k of the plurality of antenna elements towards observed signal i, ($x_k,y_k,z_k$) is the modeled phase center location for antenna element k for observed signal i, and ($\varepsilon_{x_k},\varepsilon_{y_k},\varepsilon_{z_k}$) is the error in the modeled element location for antenna element, k.

15. The control system of claim 10, wherein the processing element is further configured during said providing for:
   updating a model describing the plurality of actual phase center locations as a function of the plurality of AOAs.

16. The control system of claim 10, wherein the processing element is further configured during said calculating of the plurality of differential distance vectors for each one of the plurality of signals for:
   identifying actual fractional wavelength ($f_{true}$) values for the plurality of antenna elements for the one of the plurality of signals;
   obtaining estimated phase propagation values for the plurality of antenna elements relative to the reference location based at least on the configuration data;
   estimating an actual whole wavelength ($n_{true}$) values for the plurality of antenna elements for the one of the plurality of signals based on the estimated phase propagation values and $f_{true}$ values; and
   determining differential distance vectors for the plurality of antenna elements for the one of the plurality of signals based on a sum of the $f_{true}$ values and $n_{true}$ values.

17. The control system of claim 16, wherein the processing element is further configured during said obtaining the estimated phase propagation values for:
   calculating each of the estimated phase propagation values by modeling the first of the plurality of signals traversing an estimated differential distance between one of plurality of antenna elements and the reference location, the estimated differential distance based on the configuration data and the AOA; and
   calculating an estimated fractional wavelength ($f_{model}$) values and estimated whole wavelength ($n_{true}$) for the plurality of antenna elements for the first signal from the estimated phase propagation values.

18. A computer readable storage, having stored thereon a computer program for operating a communications system comprising an antenna array having a plurality of antenna elements, the computer program comprising a plurality of code sections for performing the steps of:
   receiving a plurality of signals at the plurality of antenna elements, the plurality of signals arriving at the array of antenna elements at a plurality of angles of arrival (AOAs) with respect to a reference location;
   calculating a plurality of differential distance vectors between the plurality of antenna elements and the reference location, each of the plurality of differential distance vectors associated with one of the plurality of AOAs and at least one of the plurality of signals;
   obtaining a plurality of actual phase center locations for the plurality of antenna elements based on the plurality of differential distance vectors and the plurality of AOAs; and
   providing a correction to configuration data for the array of antenna elements based at least on the plurality of actual phase center locations.

19. The computer readable storage of claim 18, further comprising code sections for selecting said reference location to be a location within said plurality of antenna elements.

20. The computer readable storage of claim 18, wherein said plurality of AOAs comprises at least a first, a second, and a third AOA.

21. The computer readable storage of claim 18, wherein the obtaining further comprises code sections for:
   generating a system of equations describing the plurality of differential distance vectors as a function of the plurality of actual phase center locations and the plurality of AOAs; and
   solving the system of equations to compute the plurality of phase center locations.

22. The computer readable storage of claim 21, wherein said generating further comprises code sections for selecting each of the plurality of differential distance vectors to be defined by the mathematical expression:

$$z_{ik} = [\sin\theta_{ik}\sin\phi_{ik} \quad \sin\theta_{ik}\cos\phi_{ik} \quad \cos\phi_{ik}] * \begin{bmatrix} x_k + \varepsilon_{xk} \\ y_k + \varepsilon_{yk} \\ z_k + \varepsilon_{zk} \end{bmatrix}$$

where $(\theta_{ik},\phi_{ik})$ are pointing angles from antenna element k of the plurality of antenna elements towards observed signal i, $(x_k,y_k,z_k)$ is the modeled phase center location for antenna element k for observed signal i, and $(\varepsilon_{x_k},\varepsilon_{y_k},\varepsilon_{z_k})$ is the error in the modeled element location for antenna element, k.

23. The computer readable storage of claim 18, wherein the providing further comprises code sections for:

updating a model describing the plurality of actual phase center locations as a function of the plurality of AOAs.

24. The computer readable storage of claim 18, wherein the calculating the plurality of differential distance vectors for each one of the plurality of signals further comprises code sections for:

identifying actual fractional wavelength ($f_{true}$) values for the plurality of antenna elements for the one of the plurality of signals;

calculating each of the estimated phase propagation values by modeling the first of the plurality of signals traversing an estimated differential distance between one of plurality of antenna elements and the reference location, the estimated differential distance based on the configuration data and the AOA; and calculating an estimated fractional wavelength ($f_{model}$) values and estimated whole wavelength ($n_{true}$) for the plurality of antenna elements for the first signal from the estimated phase propagation values.

estimating an actual whole wavelength ($n_{true}$) values for the plurality of antenna elements for the one of the plurality of signals based on the estimated phase propagation values and $f_{true}$ values; and determining differential distance vectors for the plurality of antenna elements for the one of the plurality of signals based on a sum of the $f_{true}$ values and $n_{true}$ values.

* * * * *